(12) United States Patent
Song

(10) Patent No.: US 6,565,030 B2
(45) Date of Patent: May 20, 2003

(54) TAPE SIMULATOR OF CASSETTE TYPE DIGITAL AUDIO/VIDEO DEVICES

(75) Inventor: O Shik Song, Soosung-gu (KR)

(73) Assignee: Hyunwon Inc. (KR)

( * ) Notice: Subject to any disclaimer, the term of this patent is extended or adjusted under 35 U.S.C. 154(b) by 0 days.

(21) Appl. No.: 09/912,135

(22) Filed: Jul. 24, 2001

(65) Prior Publication Data

US 2002/0050540 A1 May 2, 2002

(30) Foreign Application Priority Data

Oct. 27, 2000 (KR) .......................................... 2000-63546

(51) Int. Cl.[7] ............................................... G11B 15/28
(52) U.S. Cl. ......................... 242/342; 242/336; 360/132
(58) Field of Search ................................. 242/340–342, 242/336; 360/132

(56) References Cited

U.S. PATENT DOCUMENTS

| | | | | |
|---|---|---|---|---|
| 4,183,477 A | * | 1/1980 | Iwase et al. ................. | 242/336 |
| 4,479,618 A | * | 10/1984 | Okada et al. ................ | 242/336 |
| 4,566,048 A | * | 1/1986 | Tokunaga et al. ........... | 242/336 |
| 4,979,060 A | * | 12/1990 | Tanigawa .................... | 242/336 |
| 4,994,929 A | * | 2/1991 | Chen ........................... | 360/132 |
| 5,099,378 A | * | 3/1992 | Turgeon ...................... | 242/336 |
| 5,182,688 A | * | 1/1993 | Chen ........................... | 242/336 |
| 5,347,411 A | * | 9/1994 | Choi ........................... | 242/341 |
| 5,365,387 A | * | 11/1994 | Chen ........................... | 360/132 |

* cited by examiner

Primary Examiner—Kathy Matecki
Assistant Examiner—Sang Kim
(74) Attorney, Agent, or Firm—Harness, Dickey & Pierce, P.L.C.

(57) ABSTRACT

The present invention relates to a tape simulator of a cassette tape type digital audio/video device built in the cassette tape type digital audio/video device and capable of normally operating a cassette deck player by having the tape simulator recognized as a cassette tape as reproducing voice/video digital signals recorded in the device in use of the cassette deck player.

The tape simulator of the cassette tape type digital audio/video device according to the present invention comprises left and right reel hubs inserted in both driving reels of the cassette deck player to be rotated; and a rotation speed attenuating unit for attenuating the rotation speeds of the left and right reel hubs to at a predetermined rate by providing resistance to the left and right reel hubs rotated by the driving reels. The rotation speed attenuating unit includes a center gear simultaneously meshed with the left and right reel hubs; a torque producing unit for applying a certain torque to the center gear, or an idle gear meshed with the left and right reel hubs to run idle; and a rubber roller being in rolling contact with the pinch roller of the cassette deck player and meshed with the idle gear. With the structure, overall problems can be solved due to the use of a belt since the use of the belt is excluded.

9 Claims, 8 Drawing Sheets

TAPE SIMULATOR OF CASSETTE TYPE DIGITAL AUDIO/VIDEO DEVICES

BACKGROUND OF THE INVENTION

1. Field of the Invention

The present invention relates to a tape simulator of a cassette type digital audio/video device which normally operates a cassette deck player by having the cassette deck player recognize the tape simulator as a magnetic tape, which is a general cassette tape, traveling in a normal speed as the cassette deck player reproduces digital audio/video signals recorded on the cassette tape, and more particularly to a tape simulator of a cassette tape digital audio/video device structured in combinations of plural gears without a belt to recognize the general cassette tape as the magnetic tape, wherein the cassette deck player is built in the cassette tape digital audio/video device for reproductions.

2. Description of the Prior Art

Software for converting audio or video into a digital signal and storing the digital signal in voice files has been developed, and, accordingly, digital audio/video devices have been developed that can reproduce the voice files into audio or video. The voice file tends to be widely used since it has an advantage in that the audio and video reproduction qualities are excellent while compressing songs in a moving picture experts group(MPEG) audio method of a high-quality and high-compression rate different from the existing Hi-Fi audio and having 12 times as large a storage capacity as the existing Hi-Fi audio method.

In addition, in recent, as shown in FIG. 1 and FIG. 2, a cassette tape digital audio/video device 100 has been developed and widely spread, which is manufactured in a form of a general cassette tape, that is, in a form of a flat rectangular solid on both left and right sides of the center portion of which reel hubs 1 and 2 are formed to rotate while inserted into left and right reels 201 and 202 of a cassette deck 200 and can reproduce voice files alone and output the reproduced voice files through an output device such as an earphone 101 as well as reproduce the voice files stored in a digital audio/video device through a general cassette deck player by converting the voice files into analog magnet signals and inputting the converted signals in a head of the cassette deck player.

In such a cassette tape digital audio/video device, the deck of the general audio cassette deck player generally has a structure of controlling a retrieval mode(Play mode), fast-forward mode(FF mode), and rewind mode(REW mode) as for a cassette tape with a capstan of a rotation shaft keeping the speeds of the two reels and the tape constant and has functions of detecting the rotation speeds of the reels and stopping operations or ejecting the cassette tape from the deck in case that the cassette tape unusually operates as in entangled or cut-off magnetic tape, so that, accordingly, it has to be equipped with a tape simulator which can normally operate the cassette deck player by having the cassette deck player recognize the simulator as a magnetic tape traveling in a normal speed in order for the simulator to be recognized as a general cassette tape normally operating.

That is, the cassette tape digital audio/video device uses as a main memory medium the kinds of a semiconductor device rather than a magnetic tape as a memory medium differently from a general cassette tape, so that, in order to normally operate the magnetic tape in a general cassette deck player which judges if normally operated as rotation speeds of reel hubs wound, reels hubs rotated while inserted in deck reels and a tape simulator for rotating the reel hubs at the same linear speed as the rotation speeds of the reel hubs of the general cassette tape are necessary.

If the cassette tape digital audio/video device does not have the tape simulator stated as above, the cassette deck player recognizes the device as a general cassette tape having no or cut-off magnetic tape and then automatically stops or ejects the device from the deck, so that the reproductions of voice files recorded in the cassette tape digital audio/video device are impossible with the cassette deck player. Further, in case of selecting the FF mode or REW mode for song selections, the memory medium for storing actual voice files can not be controlled. Because of such a problem, the cassette simulator of the cassette tape digital audio/video device are built in the cassette tape digital audio/video device for normally operating the cassette deck player by recognizing the magnetic tape as in a normal speed as to a general cassette deck player in order to recognize the simulator as a general cassette tape in a normal operation.

FIG. 3 schematically shows a structure of a typical and conventional tape simulator of a cassette tape type digital audio/video device used for the existing cassette tape digital audio/video device.

As shown in FIG. 3, the conventional tape simulator of a cassette tape digital audio/video device includes left and right reel hubs 1 and 2 having the same structure as the reel hubs of a general cassette tape rotated while inserted in the reels 201 and 202 of a cassette deck player, and a driving unit for rotating the reel hubs 1 and 2 at the same linear speed as a capstan 203 of a deck of rotating at a constant linear speed, that is, a belt 3 connected with the capstan 203 mounted for either of the left and right reel hubs 201 and 202 to convey a magnetic tape at a normal speed and for rotating the reel hubs 201 and 202 at the same linear speed as the linear speed(tangential speed). Reference numerals 4 and 5 are no-load rotating rollers mounted for horizontally conveying the belt 3.

With the structure stated above, the tape simulator of the cassette tape digital audio/video device has the reel hobs 1 and 2 rotated at the same time as the capstan 203 of the deck by a power transmission operation of the belt 3, to thereby have the cassette deck player, which judges whether a cassette tape normally operates with the rotation speeds of the reel hubs 1 and 2, recognize as if a magnetic tape travels at a normal speed. Accordingly, the digital audio/video device is recognized as a general cassette tape normally operating by the cassette deck player, so that the cassette deck player can normally operate. Further, in the FF mode or the REW mode, a pinch roller 204 pressing the capstan motor 203 is released, the reel hubs 1 and 2 rotate at a faster speed by the rotation forces of the left and right reels 201 and 202, and the cassette deck player detects a rotation speed difference through a sensor, so that an operation according to a corresponding mode can be realized.

However, the conventional tape simulator of the cassette tape digital audio/video device as stated above has a problem in that it causes a problem in operations due to an elasticity difference in long-term usage, and, in case that there is a distance error or a torque difference between shafts of the left and right reels 1 and 2 in the deck, the mode such as Play mode, FF mode, REW mode, or the like does not work properly.

Further, the conventional tape simulator of a cassette tape digital audio/video device has the belt 3 pressed by the pinch roller 204 and traveling at a constant speed, and the belt 3 having a narrow width is mounted to be biased to one side of an outer circumference of the pinch roller 204 to avoid interference with a printed circuit board (PCB) (not shown) built in the device. Therefore, the conventional tape simulator has a problem in that one side of the outer circumference of the pinch roller 204 which is a non-consumable part of the cassette deck player becomes worn out by the belt 3. Accordingly, in case of a cassette deck player which repeatedly reproduces the cassette tape digital audio/video device, the longer the period of time in use lapses, the deeper the pinch roller 204 becomes worn out. Therefore, since a magnetic tape get damaged as a general cassette tape becomes reproduced, a voice quality reproduced from the general cassette tape becomes abruptly deteriorated.

SUMMARY OF THE INVENTION

Accordingly, the present invention has been devised to solve the above problems the conventional tape simulator of a cassette tape type digital audio/video device as stated above has, so it is an object of the present invention to provide a tape simulator of a cassette tape type digital audio/video device combined with plural gears excluding the use of a belt to avoid problems in operations of each mode such as retrieval mode, fast forward mode, rewind mode, or the like, to prevent problems of deteriorating voice qualities of general cassette tapes due to the damages to a pinch roller with operations without damaging the pinch roller which is a non-consumable part, and to simultaneously solve the problems of lowering reliability and productivity as well as the compatibility problem between cassette deck players, in case that reproductions are carried out by the cassette deck player.

The present invention, in a tape simulator built in a cassette tape type digital audio/video device retrievable with a cassette deck player and for having the tape simulator recognized as a cassette tape normally operating by having the cassette deck player recognize as if a magnetic tape traveled at a constant linear speed in order for the cassette deck player to normally operate as reproducing voice/video digital signals recorded in the device in use of the cassette deck player, comprises left and right real hubs inserted into driving reels on both sides of the cassette deck player to be rotated by the driving reels, mounted to be capable of running idle on both sides of a center portion of the cassette tape type digital audio/video device, having reel gears combined on the outer circumference thereof; and a rotation speed attenuating means for attenuating the rotation speeds of the left and right reel hubs to at a predetermined rate by providing resistance to the left and right reel hubs rotated by the driving reels.

Further, with a structure as stated above, the rotation speed attenuation means includes a center gear mounted between the left and right reel hubs, meshed with the reel gears of the left and right reel hubs at the same time, and rotated by the left and right reel hubs; and a torque producing means for applying a certain friction torque to the center gear when the center gear rotates.

Further, the rotation speed attenuation means includes an idle gear meshed with the reel gears of the left and right reel hubs to run idle; a rubber roller having a friction pulley part and a gear part incorporated in one body and having the same rotation center, the friction pulley part being in a rolling contact with a pinch roller of the cassette deck player moving downwards in a play mode, and the gear part being meshed with the idle gear; and an elastic means for elastically supporting the rubber roller toward the pinch roller.

In addition, it is preferable that the torque producing means includes a friction plate closely contacted with one side of the center gear for friction; and a volute spring for elastically supporting the center gear toward the friction plate.

Further, the rotation shaft of the rubber roller is hinged in the rotation shaft of the idle gear to rotate in a range of predetermined rotation angles on the outer circumference of the idle gear, and the elasticity means elastically supporting the rubber roller is, preferably, a twist coil spring for elastically supporting the rubber roller against a device case.

Further, the rubber roller further includes a friction band of a rubber substance inserted on the circumference of the friction pulley part, being in rolling contact with the pinch roller, and increasing a friction force as to the pinch roller.

BRIEF DESCRIPTION OF THE DRAWINGS

The above object and other advantages of the present invention will become more apparent by describing in detail a preferred embodiment thereof with reference to the attached drawings, in which.

DETAILED DESCRIPTION OF THE PREFERRED EMBODIMENT

Hereinafter, a preferred embodiment of the present invention constructed by including all the constituents stated above will be described in detail through the accompanying drawings.

Figure 4:
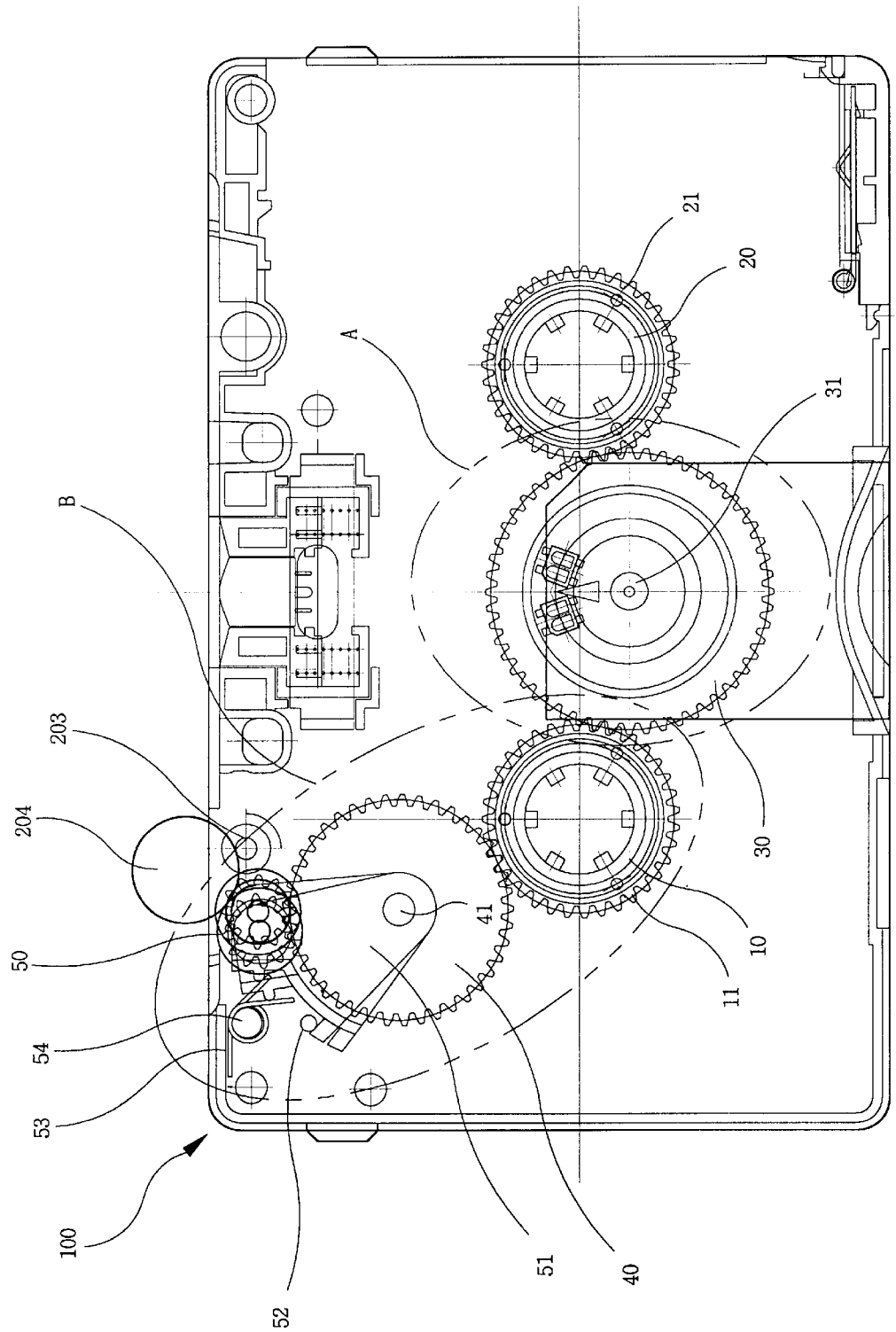
FIG. 4 is a view for showing a tape simulator of a cassette tape type digital audio/video device according to an embodiment of the present invention.
Figure 5:
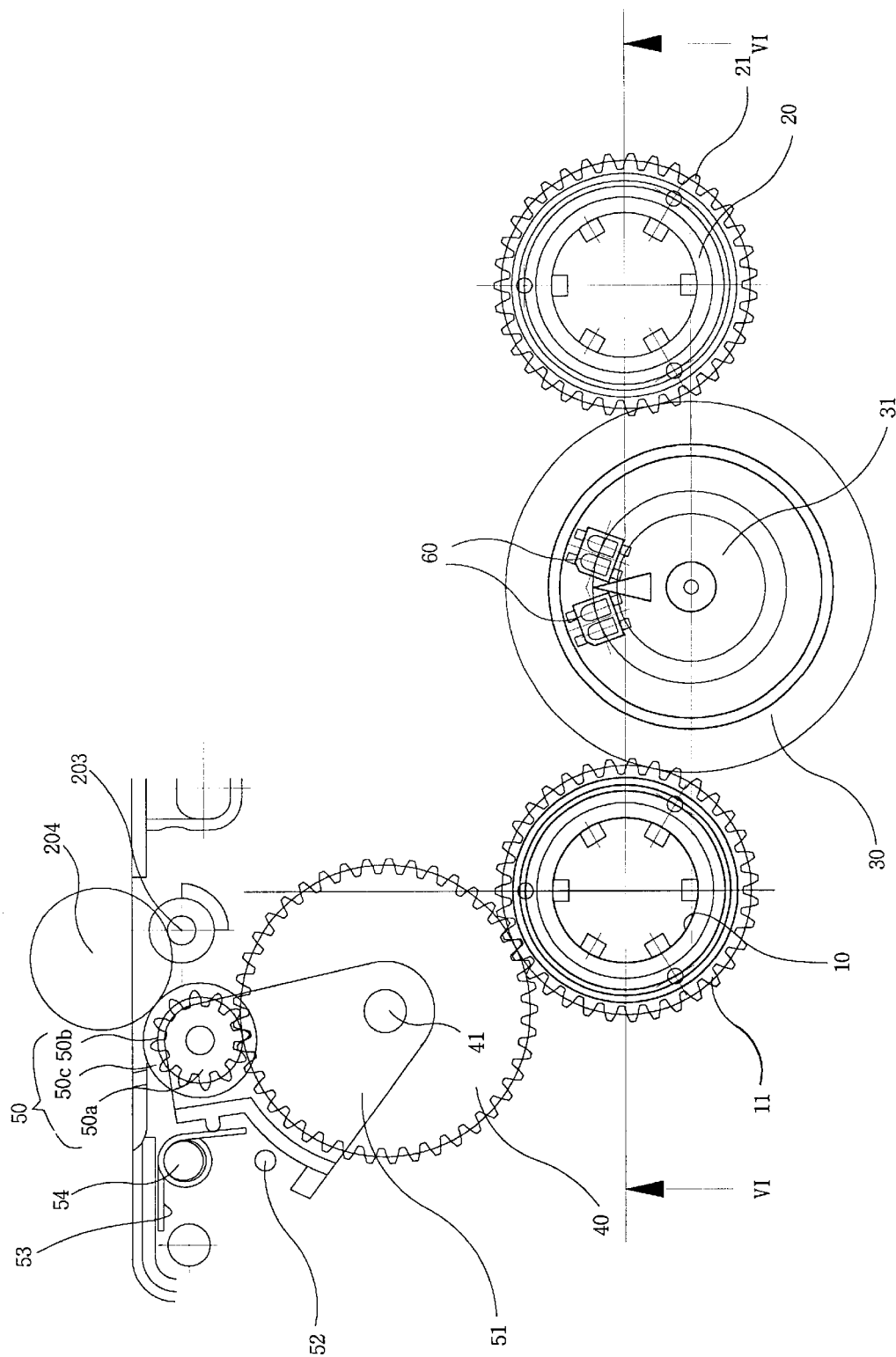
FIG. 5 is a partially enlarged view of FIG. 4.

FIG. 4 is a cross-sectioned view of a cassette tape type digital audio/video device showing a tape simulator of the cassette tape type digital audio/video device according to an embodiment of the present invention, and FIG. 5 is a partially enlarged view of a tape simulator of the cassette tape type digital audio/video device according to an embodiment of the present invention.

Figure 1:
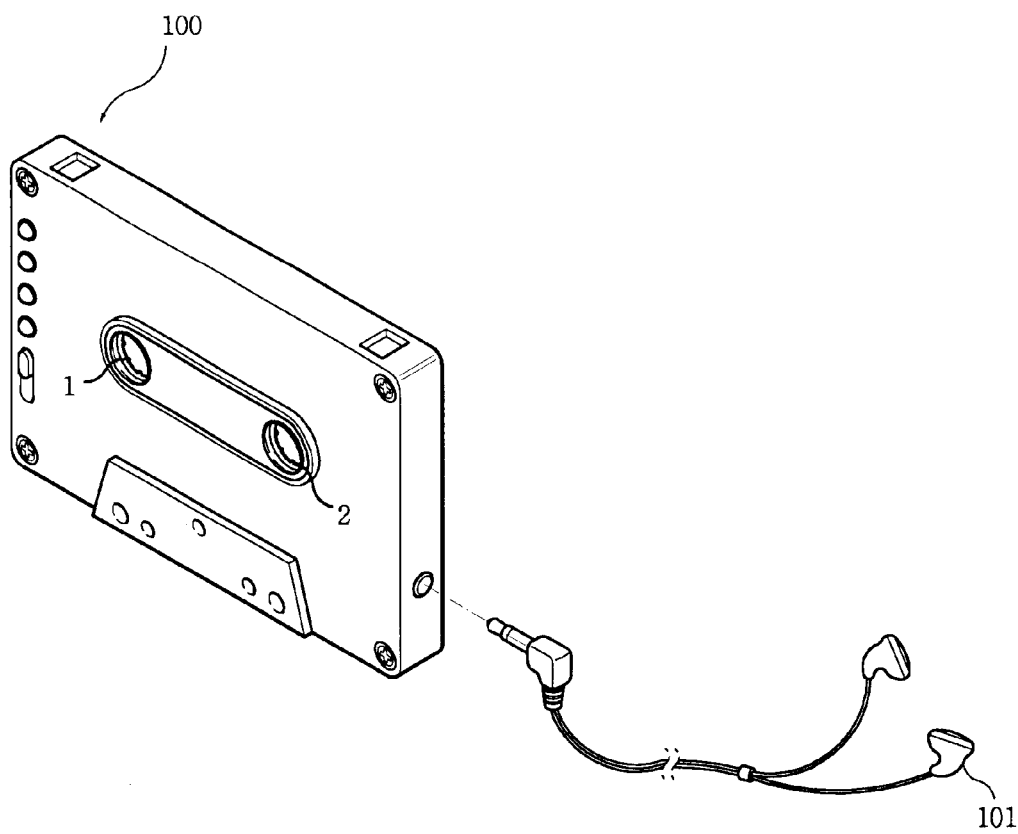
FIG. 1 is a perspective view for showing a general cassette tape type digital audio/video device.
Figure 2:
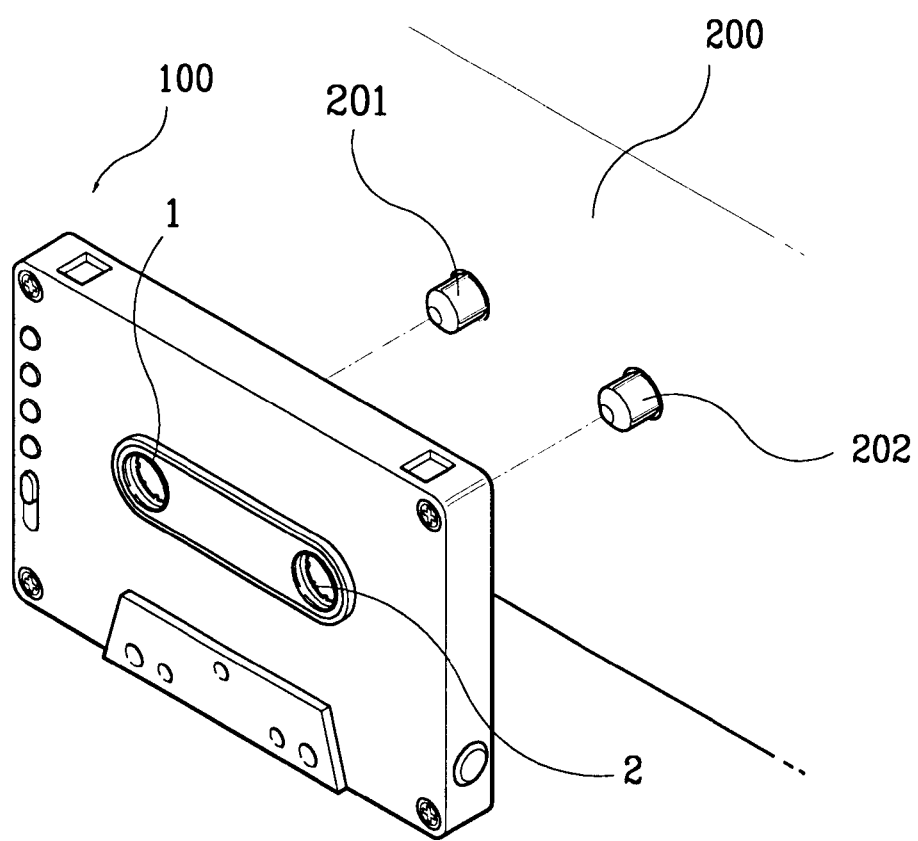
FIG. 2 is a view for showing a state in use of a general cassette tape type digital audio/video device.
Figure 3:
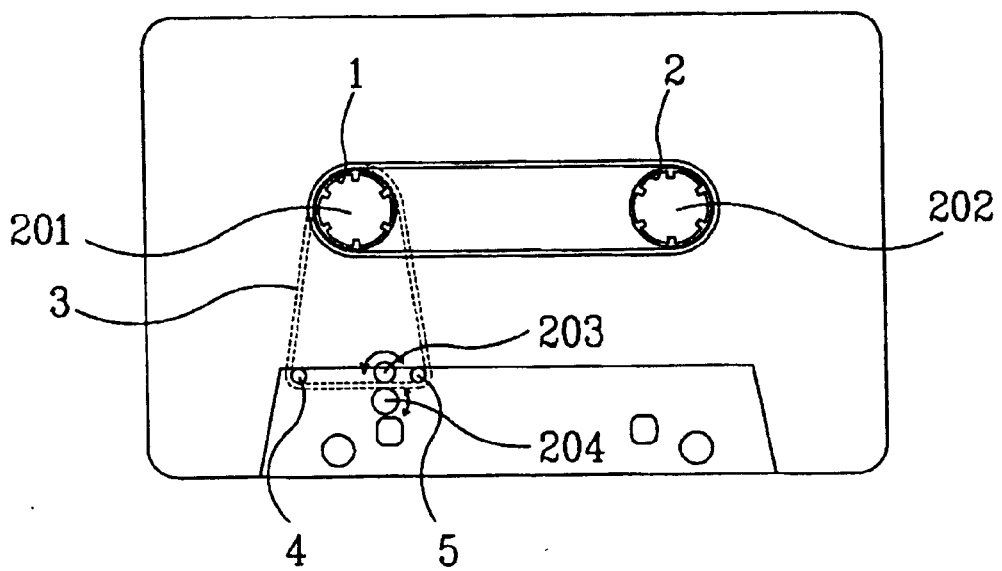
FIG. 3 is a view for showing a conventional tape simulator of a cassette tape type digital audio/video device.

The tape simulator of the cassette tape type digital audio/video device according to an embodiment of the present invention as shown in FIG. 4 has a torque unit A capable of applying a torque with a friction force by a friction material between left and right reel hubs 10 and 20 and an interlock unit for applying the torque by using a rotation force of a capstan 203 of a deck rotated at a constant linear speed at a linear speed slower than a linear speed of a deck reel, wherein the left and right reel hubs 10 and 20 are rotated by driving reels(refer to the reference numerals 201 and 202 of FIG. 2) of the deck (refer to the reference numeral 200 of FIG. 2) and the torque unit A is for applying a constant torque to the left and right reel hubs 10 and 20 in order for the left and right reel hubs 10 and 20 to be rotated at a constant speed.

With such a structure, the tape simulator of the cassette tape type digital audio/video device according to an embodiment of the present invention can realize normal operations required in all kinds of cassette deck players by applying a constant torque in use of the torque clutch unit A to the reel hubs 10 and 20 rotated by the left and right reels (reference numerals 201 and 202 of FIG. 2) of the deck and transferring a 100 percent of a rotation force of the pinch roller 204 of the deck by the interlock unit B.

A torque required upon retrieval (Play mode) in the decks of all the cassette deck players employed for general cassette tapes lies in a range of 35 g/cm~75 g/cm and is very various by the kind of deck and by manufacturer, but the requirements can be satisfied for all the decks by the torque unit A and the interlock unit B stated above. That is, firstly, a torque of about 15 g/cm is applied from the torque clutch unit A and, secondly, a torque of 20 g/cm is additionally applied from the interlock unit B. Therefore, a torque of 35 g/cm is totally applied to the left and right reel hubs 10 and 20, that is, the left and right reels (reference numerals 201 and 202 of FIG. 2), to thereby obtain an effect of normal driving by general cassette tapes.

Figure 6:
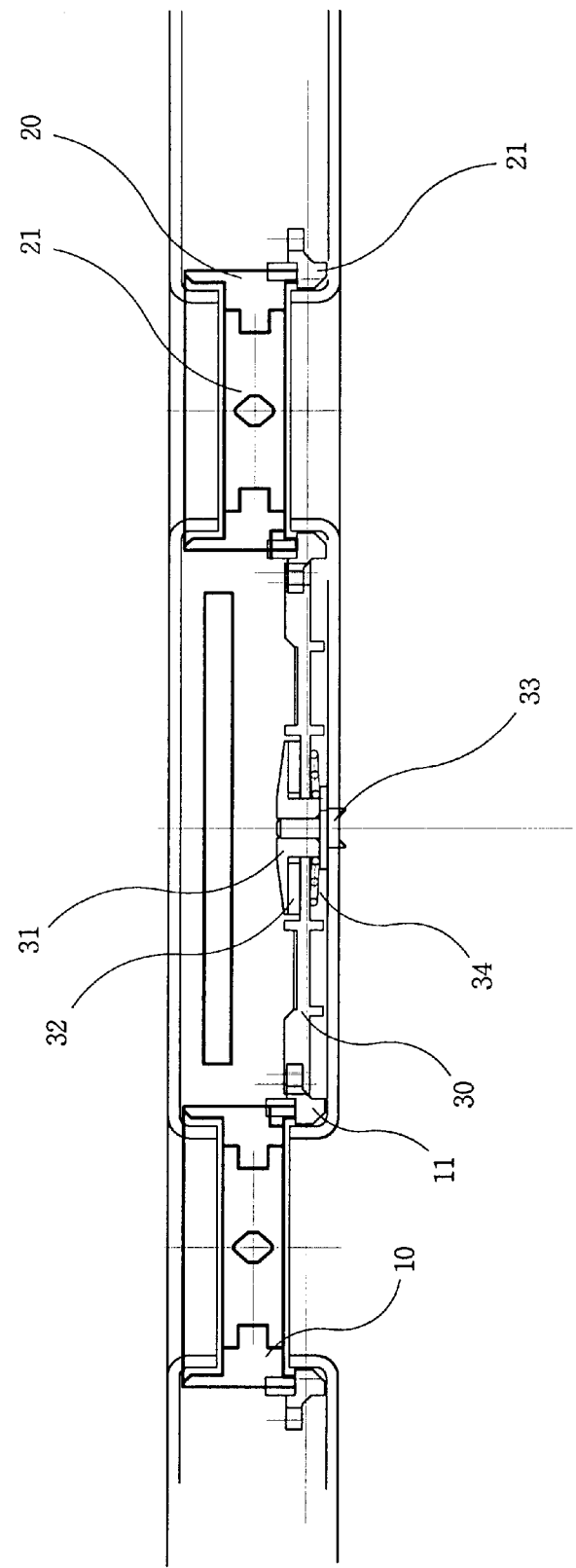
FIG. 6 is a cross-sectioned view taken along lines VI—VI of FIG. 5.

FIG. 5 and FIG. 6 are a partially enlarged view and a cross-sectioned view for showing the torque unit A and the detailed operation principle respectively. As shown in FIG. 5 and FIG. 6, the torque clutch unit A is constructed with a torque producing unit including the left and right reel hubs 10 and 20; a center gear 30 simultaneously meshed with reel gears 11 and 21 connected with the outer circumferences of the left and right reel hubs between the left and right reel hubs 10 and 20 and rotated by the left and right reel hubs 10 and 20; a friction plate 32 causing friction by closely contacting with a side of the center gear 30 and for applying a certain friction torque to the center gear 30 as the center gear rotates; a volute spring 34 elastically supporting the center gear 30 against the friction plate 32 for reference, a reference numeral 60 denotes speed sensors sensing the number of rotations of the center gear 30.

With the structure stated above, in case that the digital audio/video device is in a retrieval mode (Play mode), if the left and right reels (reference numerals 201 and 202 of FIG. 2) of the deck drives the left and right reel hubs 10 and 20, the center gear 30 meshed with the reel gears 11 and 21 on the outer circumference thereof. At this time, as shown in FIG. 5, the left and right reel hubs 10 and 20 are disposed between the center gear 30 and a fixture cap 31 fixed at a shaft 33 for fixing the center gear 30, and a certain friction force is applied to the left and right reel hubs 10 and 20 by the friction plate 32 of felt substance or leather elastically supported by the volute spring 34 to attenuate the rotation speed to less than a certain level.

Figure 7:
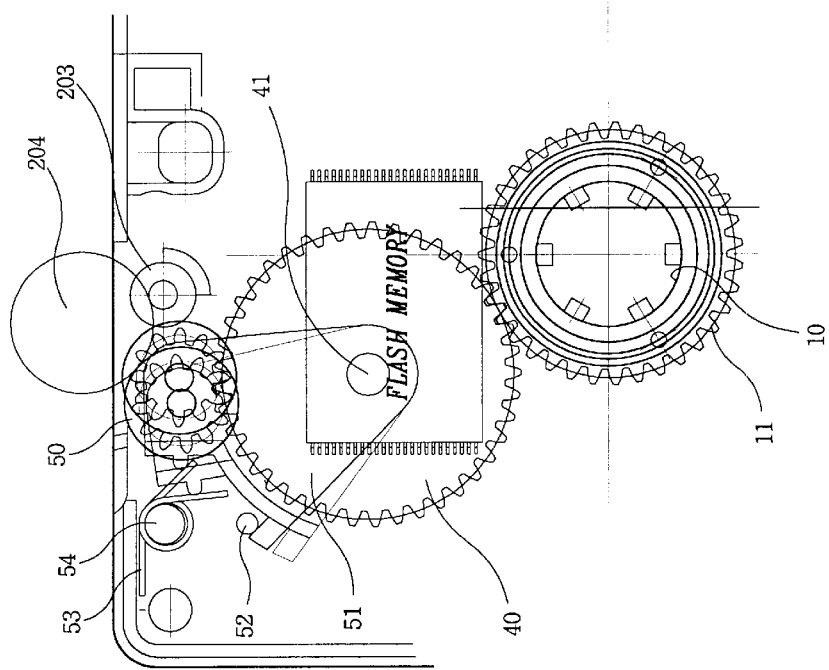
FIG. 7 is a left-side view of FIG. 5.
Figure 7:
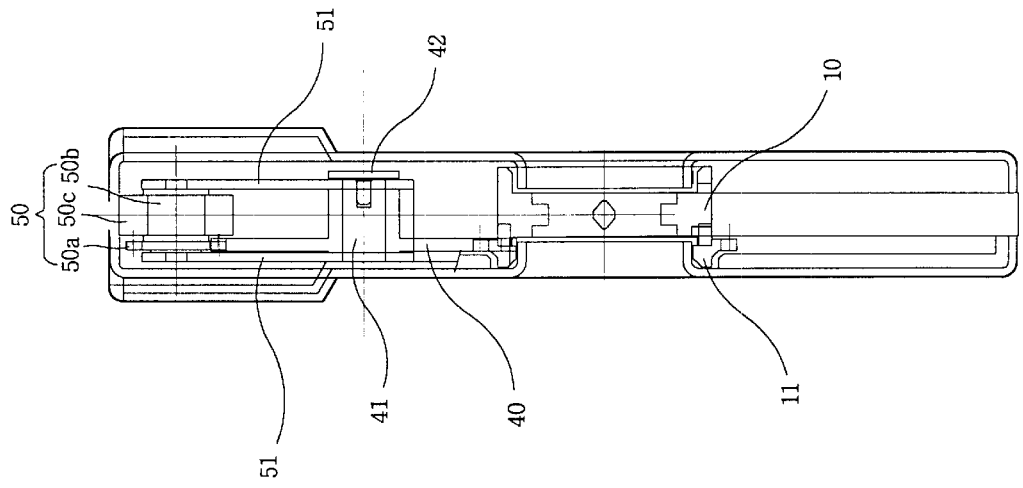

FIG. 7 is an enlarged view and left-side view for showing a structure of the interlock unit B and a detailed operation principle respectively.

As shown in FIG. 7, the interlock unit B has an idle gear 40 rotating with no load while meshed with the reel gears 11 and 21 of the left and right reel hubs; a rubber roller 50 having a gear part 50a and a friction pulley part 50b which are incorporated, the gear part 50a being meshed with the idle gear 40 and the rubber roller 50 being in the rolling contact with the pinch roller 204 of the deck by a friction band 50c of rubber (or urethane, silicon, or the like) inserted around the outer circumference of the friction pulley part 50b; and a twist coil spring 53 fixed to the fixture shaft 54 and for elastically supporting the rubber roller 50 toward the pinch roller 204.

The rubber roller 50 is fixed to a rotation shaft 41 of the idle gear 40 to run idle in a predetermined angle range along the outer circumference of the idle gear 40 by a housing 51 hinged to the rotation shaft 41 of the idle gear 40 and a stopper 52 of limiting the rotations of the housing 51.

With a structure stated above, in the interlock,,unit B, the rubber roller 50 receives a rotation force of the capstan 203 rotating at a constant linear speed through the pinch roller 204 and transfers 100% of the rotation force to the left reel hub 10 via the idle gear 40. Here, since the pinch roller 204 of the deck rotates by the capstan 203, the rubber roller 50 should be in a close contact to the pinch roller 204, and the pinch roller 204 to the capstan 203, all the time. In order to do so, the pinch roller 204 receives a force toward the capstan 203 all the time by a spring (not shown) built in the deck.

In the meantime, since normal play operations are not carried out if the pinch roller 204 is spaced apart from the capstan 203 by the rubber roller 50, the rotation shaft of the rubber roller 50 is rotatably fixed to the rotation shaft of the idle gear 40 by the housing 51, so the rubber roller 50 rotates against the circumference of the idle gear 40 according to the upward and downward movements of the pinch roller 204. Accordingly, rotations are carried out in a meshed state of the gear part 50a of the rubber roller 50 and the idle gear 40, to eliminate an ill effect due to the movements of the rotation shaft.

With the structure stated above, in the interlock unit B, if the Play mode is executed in the cassette deck player, the pinch roller moves downwards to be in contact with the capstan 203 and the rubber roller 50. At this time, the rubber roller 50 rotates counterclockwise against the rotation shaft 41 of the idle gear 40, receives a force of an opposite direction (clockwise direction) by the twist coil spring 53 to be in contact with the pinch roller 204 through the friction band 50c and then to be in a rolling contact with the pinch roller 204.

Accordingly, if the capstan 203 rotates, the pinch roller 204, rubber roller 50, idle gear 40, and left reel hub 10 are rotated in turn, and the capstan 203 transfers its rotation force to the left reel hub 10 while maintaining its linear speed. Therefore, the left and right reel hubs 10 and 20 which tends to be rotated at a faster linear speed than the linear speed of the capstan 203 reduces the rotation speeds thereof to be rotated at the same linear speed as the linear speed of the capstan 203, which has the same effect as a magnetic tape of a general cassette tape passing between the capstan 203 and the pinch roller 204 normally travels to be rewound on the left reel hub 10.

Figure 8:
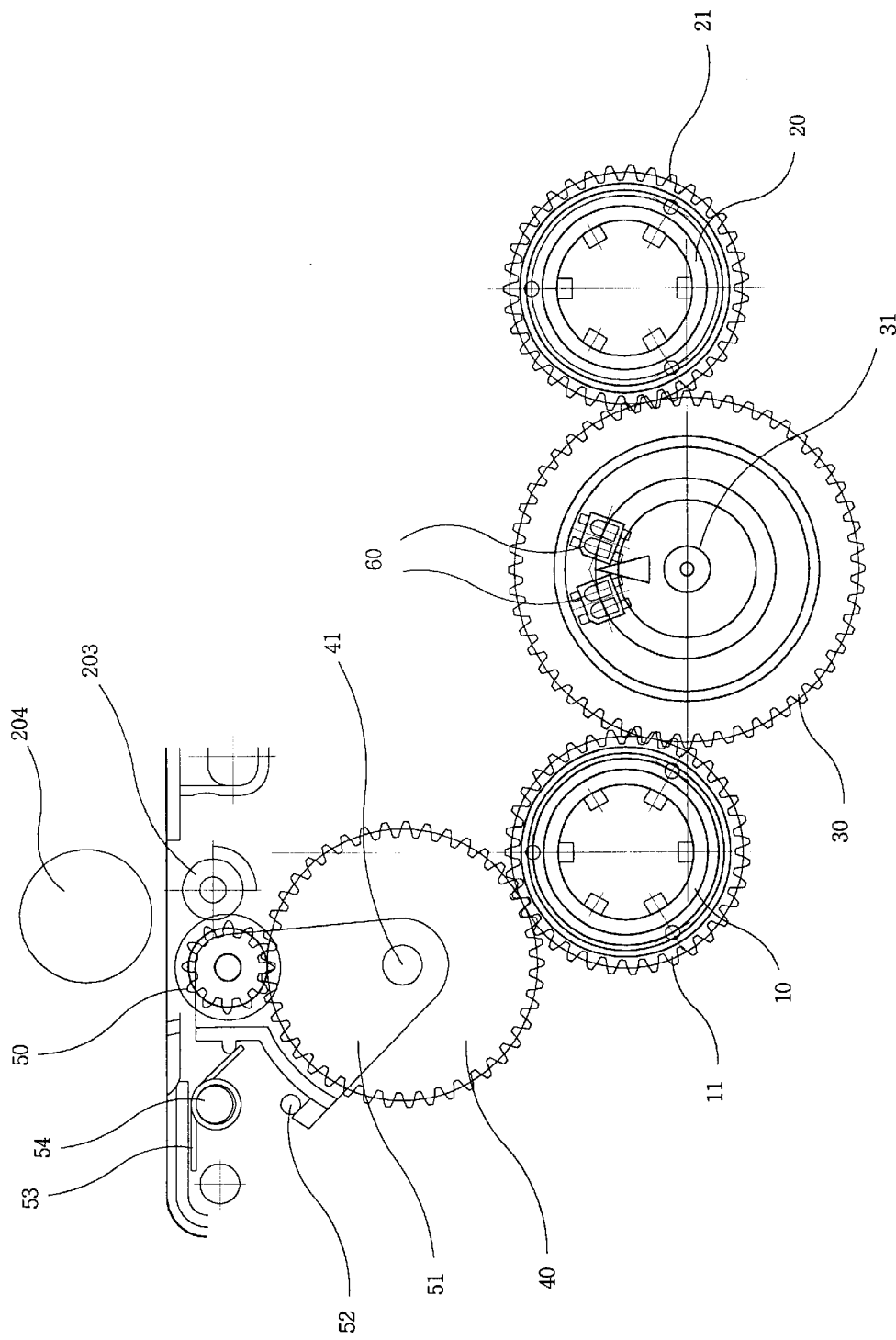
FIG. 8 is a view for explaining operations of a fast forward mode or a rewind mode of a tape simulator of a cassette tape type digital audio/video device according to an embodiment of the present invention.

FIG. 8 is a view for showing operation states in the fast forward mode or the rewind mode of a cassette deck player. At this time, as shown in FIG. 8, since the pinch roller 204 of the deck does not move downwards, a driving force of the deck is transferred to the left and right reel hubs 10 and 20 through the left and right reels (reference numerals 201 and 202 in FIG. 2). Accordingly, the left and right reel hubs 10 and 20 are rotated only by the driving forces of the left and right reels. At this time, the idle gear 40 and the rubber roller 50 run idle to have no influence at all on the rotations of the left and right reel hubs 10 and 20, to thereby normally carry out the fast forward mode and the rewind mode.

As described in detail above, a tape simulator of a cassette tape type digital audio/video device according to the present invention has no problem of operations due to an elasticity difference of belts since the use of the belts is excluded in transferring the rotation force of the capstan to the left and right reel hubs, and has excellent operations in the modes such as play mode, FF mode, REW mode, and so on, in case that there is a distance error or a torque difference between the shafts of the left and right reels of the deck.

Even in case of repeatedly using the cassette tape type digital audio/video device over a long period of time in a cassette deck player, the device prevents problems of deteriorating voice qualities of general cassette tapes due to the damages to a pinch roller and completely solves the problems of lowering reliability and productivity as well as the compatibility problem between the cassette deck players by virtue of the use of a belt.

What is claimed is:

1. A tape simulator built in a cassette tape type digital audio/video device retrievable with a cassette deck player and for having the tape simulator recognized as a cassette tape normally operating by having the cassette deck player recognize as if a magnetic tape traveled at a constant linear speed in order for the cassette deck player to normally operate as reproducing voice/video digital signals recorded in the device in use of the cassette deck player, comprising:

left and right reel hubs inserted into driving reels on both sides of the cassette deck player to be rotated by the driving reels, mounted to be capable of running idle on both sides of a center portion of the cassette tape type digital audio/video device, having reel gears combined on the outer circumference thereof;

a rotation speed attenuating means for attenuating the rotation speeds of the left and right reel hubs to at a predetermined rate by providing resistance to the left and right reel hubs rotated by the driving reels;

a center gear mounted between the left and right reel hubs, meshed with the reel gears of the left and right reel hubs at the same time, and rotated by the left and right reel hubs; and a torque producing means for applying a certain friction torque to the center gear when the center gear rotates.

2. The tape simulator as claimed in claim 1, wherein the rotation speed attenuation means includes:

an idle gear meshed with the reel gears of the left and right reel hubs to run idle;

a rubber roller having a friction pulley part and a gear part incorporated in one body and having the same rotation center, the friction pulley part being in a rolling contact with a pinch roller of the cassette deck player moving downwards in a play mode, and the gear part being meshed with the idle gear; and an elastic means for elastically supporting the rubber roller toward the pinch roller.

3. The tape simulator as claimed in claim 1 or claim 2, wherein the torque producing means includes:

a friction plate closely contacted with one side of the center gear for friction; and a volute spring for elastically supporting the center gear toward the friction plate.

4. The tape simulator as claimed in claim 3, wherein the friction plate is made of felt.

5. A tape simulator built in a cassette tape type digital audio/video device retrievable with a cassette deck player and for having the tape simulator recognized as a cassette tape normally operating by having the cassette deck player recognize as if a magnetic tape traveled at a constant linear speed in order for the cassette deck player to normally operate as reproducing voice/video digital signals recorded in the device in use of the cassette deck player, comprising:

left and right real hubs inserted into driving reels on both sides of the cassette deck player to be rotated by the driving reels, mounted to be capable of running idle on both sides of a center portion of the cassette tape type digital audio/video device, having reel gears combined on the outer circumference thereof; and a rotation speed attenuation means for attenuating the rotation speeds of the left and right reel hubs to at a predetermined rate by providing resistance to the left and right reel hubs rotated by the driving reels;

an idle gear meshed with the reel gears of the left and right reel hubs to run idle;

a rubber roller having a friction pulley part and a gear part incorporated in one body and having the same rotation center, the friction pulley part being in rolling contact with a pinch roller of the cassette deck player moving downwards in a play mode, and the gear part being meshed with the idle gear; and an elastic means for elastically supporting the rubber roller toward the pinch roller.

6. The tape simulator as claimed in claim 5 or claim 2, wherein a rotation shaft of the rubber roller is hinged in a rotation shaft of the idle gear to rotate in a range of predetermined rotation angles on the outer circumference of the idle gear.

7. The tape simulator as claimed in claim 5 claim 2, wherein the elastic means is a twist coil spring for elastically supporting the rubber roller against a device case.

8. The tape simulator as claimed in claim 5 or claim 2, wherein the rubber roller further includes a friction band inserted on the circumference of the friction pulley part, being in rolling contact with the pinch roller, and increasing a friction force as to the pinch roller.

9. The tape simulator as claimed in claim 8, wherein the friction band is made of rubber.

* * * * *